United States Patent [19]

Ring et al.

[11] Patent Number: 4,854,707
[45] Date of Patent: Aug. 8, 1989

[54] METHOD AND APPARATUS FOR THE OPTICAL ELECTRONIC MEASUREMENT OF A WORKPIECE

[75] Inventors: Manfred Ring, Radolfzell; Jürgen Weber, Hamburg; Helmut Ackermann, Norderstedt, all of Fed. Rep. of Germany

[73] Assignee: Georg Fischer Aktiengesellschaft, Schaffhausen, Switzerland

[21] Appl. No.: 213,502

[22] Filed: Jun. 27, 1988

Related U.S. Application Data

[63] Continuation of Ser. No. 810,930, Dec. 18, 1985, abandoned.

[30] Foreign Application Priority Data

Dec. 20, 1985 [CH] Switzerland ............... 6071/84

[51] Int. Cl.$^4$ .............................................. G01B 9/02
[52] U.S. Cl. ........................................ 356/356; 356/387
[58] Field of Search ............... 356/354, 355, 356, 384, 356/385, 386, 387, 388

[56] References Cited

U.S. PATENT DOCUMENTS 3,812,376 5/1974 Takeyama et al. ............ 356/355
3,937,580 2/1976 Kasuan ............................. 356/354
3,941,484 3/1976 Dreyfus ........................... 356/388
4,131,365 12/1978 Pryor ............................... 356/356

FOREIGN PATENT DOCUMENTS 0022237 1/1981 European Pat. Off. .
2458807 7/1975 Fed. Rep. of Germany .
2613224 6/1977 Fed. Rep. of Germany .
3100550 1/1982 Fed. Rep. of Germany .

OTHER PUBLICATIONS

M. Born, E. Wolf, *Principles of Optics,* Pergamon Press, Oxford, 1975, pp. 428–430 and 432–435.

*Primary Examiner*—Vincent P. McGraw
*Assistant Examiner*—S. A. Turner
*Attorney, Agent, or Firm*—Marmorek Guttman Rubenstein

[57] ABSTRACT

An optical electronic method for the measuring of a workpiece is disclosed. A beam of radiation is used to illuminate an edge of the object to be measured to form an actual diffraction pattern. The actual diffraction pattern is converted to electronic signals by means of a sensor and correlated electronically with a predetermined theoretically calculated diffraction pattern.

14 Claims, 3 Drawing Sheets

METHOD AND APPARATUS FOR THE OPTICAL ELECTRONIC MEASUREMENT OF A WORKPIECE

This is a continuation, of application Ser. No. 810,930, filed Dec. 18, 1985, now abandoned.

FIELD OF THE INVENTION

This invention relates to an apparatus and method for the optical-electronic measuring of machine parts or other objects.

BACKGROUND OF THE INVENTION

Prior art optical-electronic measuring methods for the testing or measuring of parts or workpieces, utilize the shadow produced by the workpiece, when the workpiece is illuminated with a beam of radiation. The shadow is detected by sensing apparatus which produces electrical signals that are interpreted for purposes of measurement. Thus, these prior art measuring methods use geometrical optics as opposed to wave optics.

The degree of measuring precision that can be achieved by these measuring methods often is not sufficient. In addition, when using such measuring methods, it is often required that precise distances be maintained between light source, workpiece and sensor. There may be an unfavorable effect as concerns measuring precision, if the distances cannot be maintained with the required precision during construction or assembly, or if the size of the workpiece or object to be measured is changed during the measuring process, for instance due to temperature changes or vibrations. In the prior art measuring methods, it is often necessary that the required precision be maintained even upon a displacement of the measuring instrument longitudinally relative to the workpiece to be measured. Another disadvantage is that to obtain a precise measurement the sensor must have a high capacity of resolution. It should be noted that many sensors which are available at the present time do not have a satisfactory resolution capacity. This problem may be solved in part when the electronic signals produced by the sensor are evaluated, which, however, detracts from the reliability of the measuring results.

German patent application DE-OS No. 2458807 discloses a method for measuring the distance between parallel lines in connection with the manufacture of semiconductor integrated circuits. The method of the German patent application uses diffraction patterns. Here the diffraction pattern is obtained from light reflected by the object measured. Because of the required reflection of the light by the object measured, application of this measuring method is very limited and can only be used in connection with devices such as semiconductor integrated circuits.

It is the object of the present invention to create a method and apparatus for the optical electronic measuring or testing of a workpiece or other objects wherein the disadvantages inherent in the known methods can be prevented. It is a further object of the invention to provide a measuring method and apparatus that has a measuring precision in the micron range and has multi-application purposes, such as the measuring of diameters and longitudinal distances as well as for testing or determining the contours of parts.

SUMMARY OF THE INVENTION

The present invention is an optical-electronic method and apparatus for measuring diameters of workpieces and other objects and for determining the contours of objects. The apparatus and method of the invention, despite being of simple construction as concerns the measuring optics, will afford an ample measuring range while keeping the measuring precision constant.

In the present invention an edge of a workpiece is illuminated with a beam of radiation to form an actual diffraction pattern. The actual diffraction pattern is converted into electronic signals by means of a sensor and correlated with a predetermined and possibly theoretically calculated diffraction pattern.

Thus, the present invention uses the diffraction patterns produced by a workpiece to measure the workpiece rather than using a geometrical optics technique, such as sensing the shadow produced by the workpiece. As a result, in the method and apparatus of the present invention, the position of the workpiece edge to be measured need not be exactly positioned relative to the sensor, as is required when a shadow-type geometrical optics technique is used. With the utilization of computerized image processing, the contour of the workpiece edge to be measured is determined by way of computer programs. Thereby, a contour can be determined with greater precision than a contour that is determined by way of geometrical imaging. Even the strong interference effects that are felt with the utilization of laser light do not have an adverse effect on the method of this invention; rather, they contribute to the exact determination of the edge contour or distance to be measured.

By using the apparatus of this invention, all requirements are fulfilled as concerns the testing of parts or workpieces in an automatic manufacturing process. These requirements are:

contact-free measuring;
short measuring times (a few seconds);
a greater measuring range;
a low degree of measuring uncertainty (a few micrometers);
short evaluation times, so that the working tools can be adjusted without waste of time.

DETAILED DESCRIPTION OF THE INVENTION

Figure 1:
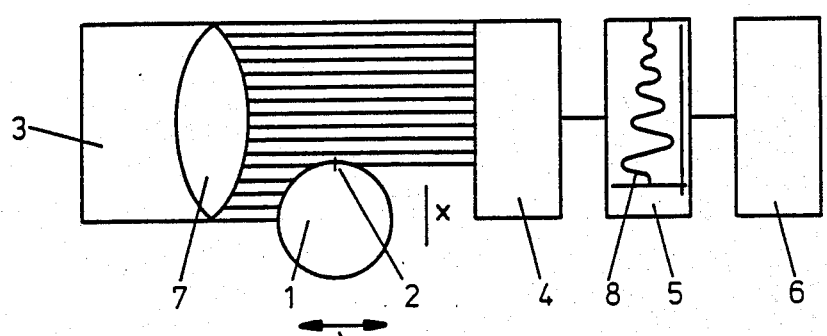
FIG. 1 shows a schematic representation of a measuring apparatus and method for measuring a workpiece, in accordance with an illustrative embodiment of the invention.

The measuring apparatus illustrated in FIG. 1 shows a workpiece or other object 1 to be measured or tested. The workpiece 1 has an edge 2 arranged between a light source 3 and a sensor 4. When illuminated with light, the edge 2 produces a diffraction image 8 which is converted into electrical signals by the sensor 4. The electrical signals 5 generated in sensor 4, corresponding to the diffraction image 8, are transferred to an evaluation device 6 which illustratively comprises one or more computers, in which the position and/or contour of edge 2 is calculated. Here, the coherent and monochromatic light source 3 is preferably a laser diode, whose radiation is widened by a lens system 7 and directed parallel. The lens system 7 is preferably achromatic. Any small aberrations resulting from the use of the achromatic lens system 7 can be removed to a considerable extent in the computer through correction programs.

Figure 2:
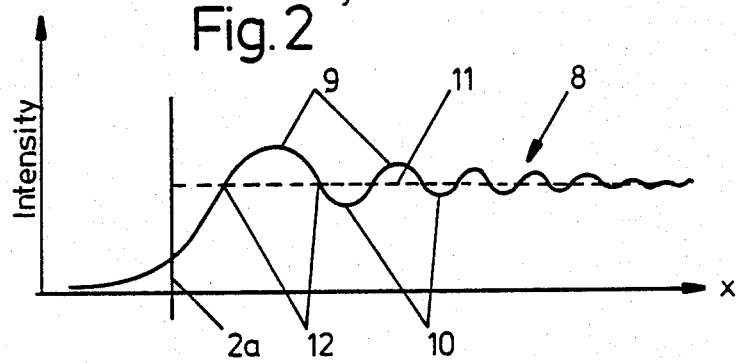
FIG. 2 shows a diffraction pattern which is produced when a workpiece is illuminated, in accordance with an illustrative embodiment of the present invention.

For a rotationally symmetrical workpiece, such as the workpiece 1 shown in FIG. 2, it is often desirable to determine the contour of the workpiece edge along the Z-axis.

A surface sensor which provides a two-dimensional image, such as a CCD-matrix camera, may be used for this purpose. However, the resolution or the measuring range resulting therefrom would be insufficient. In the present invention, one or more line sensors 4, which can be displaced along the Z-axis (FIG. 3) during the measuring operation relative to the workpiece to be measured are used to measure the contour of the edge. Such a line sensor may have up to three times the measuring range of a surface sensor and typically comprises a sufficient quantity of diodes arranged linearly to separate the higher order diffraction maxima. The light sensitivity of the individual diodes of the line sensor 4 varies up to about 10%, whereby image evaluation can be made difficult and the measurement result can include errors. This, however, can be corrected beforehand, by determining certain parameters for each diode, inputting them into the computer, and compensating for such variations when the final evaluation is made by means of a fast technique, such as the "Pixel Correction".

The diffraction pattern 8 detected by the line sensor 4 as a result of illumination of edge 2 by light source 3 is shown in FIG. 2, wherein the light intensity of the diffraction image has been represented in the direction of the X-axis. The diffracted image 8 shows the maximum values 9 and minimum values 10 and also the intersection points 12, which intersect the mean light intensity line 11. The diffracted image 8, especially the maxima 9, the minima 10 and the intersection points 12 are evaluated, wherein these values and a diffracted image that has been theoretically calculated or obtained through simulation and then stored, serves as starting points for the calculation. In FIG. 2, the first and second intensity peaks along the X-axis are the zero and first order maxima of the diffraction pattern of FIG. 2, respectively. The theoretically obtained diffraction image is based on a theoretical position and contour of the object or workpiece to be measured. In the calculation, a correlation of the theoretical diffracted image and the measured diffracted image takes place. The theoretical diffraction image is calculated by known formulas, such as, for instance, the one given by M. Born, E. Wolf, in *Principles of Optics*, Pergamon Press, Oxford 1975, which is inputted in the computer's storage (memory). In FIG. 2, the theoretical position of edge 2 has been designated by the reference character 2a.

Figure 3:
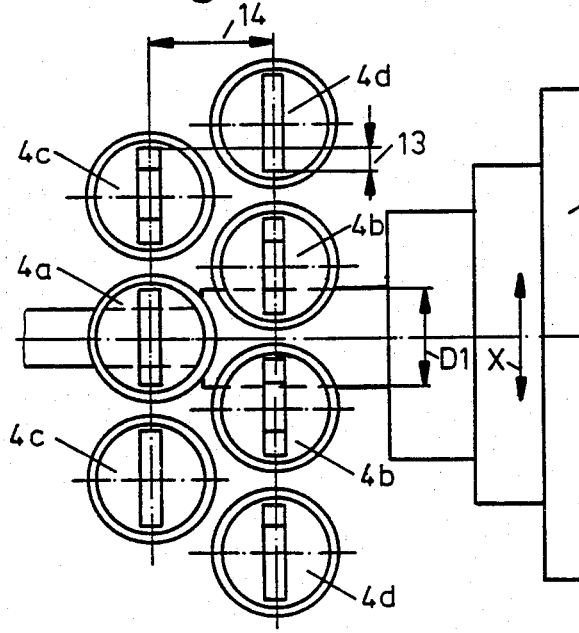
FIG. 3 shows the schematic arrangement of the sensors in relation to the workpiece to be measured, in accordance with an illustrative embodiment of the present invention.
Figure 4:
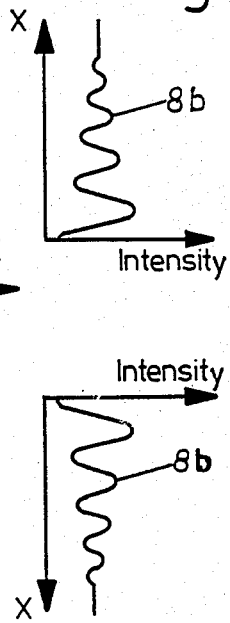
FIG. 4 shows the diffraction images in a diameter-measuring process.
Figure 6:
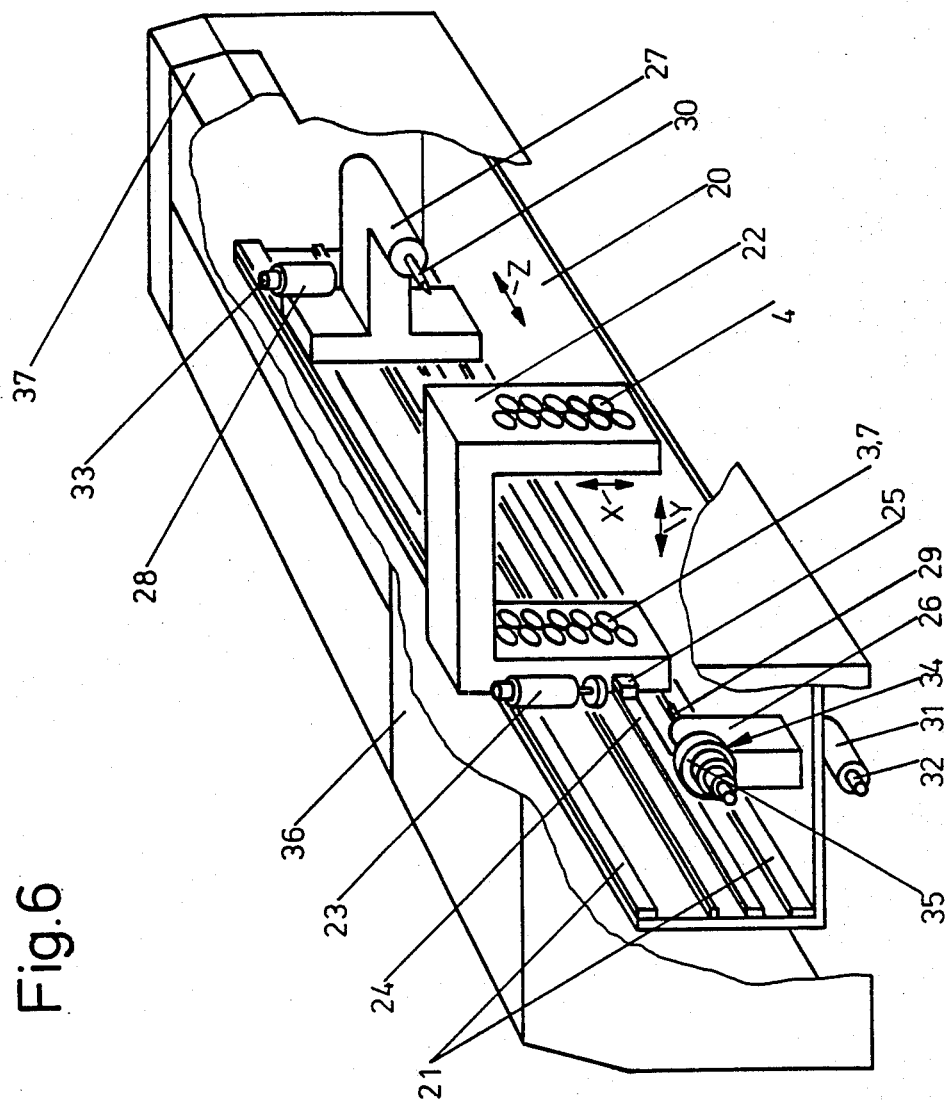
FIG. 6 shows an embodiment of a measuring apparatus in accordance with an illustrative embodiment of the present invention.

FIG. 3 shows an arrangement of linear sensors 4, which is used to enlarge the measuring range of the measuring apparatus illustrated in FIG. 6. Here several line sensors 4 are provided, arranged in two linear rows one after the other in such a way that there is a mutual overlapping 13 of sensor measuring ranges in the X-direction. Preferably, a light source 3 is attributed to each line sensor 4 of FIG. 3. In the example illustrated, seven line sensors 4 have been arranged, wherein the sensor 4a has a first measuring range, the two sensors 4b have a second measuring range, the two sensors 4c have a third measuring range and the two sensors 4d have a fourth measuring range. The two rows of linear sensors 4 are separated by a fixed distance 14 along the Z-axis. The maximum measuring range of each set of sensors 4a, 4b, 4c, 4d, in each case, is represented by the successively larger diameters of the step-shaped rotationally symmetrical part 1. For example, the diameter D1 may, for example, be measured using the two line sensors 4b, wherein the diffracted images 8b illustrated in FIG. 4 are produced, from which the actual diameter D1 is calculated.

FIG. 6 shows an embodiment of a measuring apparatus. A stand 20 is provided with guide rails 21 on which stand there is arranged a sled 22, displaceable along the Z-axis. On the U-shaped sled 22, there are arranged at oppositely disposed locations along the Y-axis, the line sensors 4, and the light sources 3 and associated lens systems 7.

The sled 22 is provided with an NC-controlled drive 23, wherein the exact location of the sled on the Z-axis is determined by means of a linear measuring stick 24 and a distance indicator 25. The receiving arrangement for the part or workpiece to be tested comprises a headstock 26 and a tailstock 27. The tailstock 27 is provided with a delivery drive 28 and an angle indicator 33. The workpiece is held between the tips 29, 30. Tip 29 of headstock 26 can be activated by means of a rotary drive 31 which is provided with an angle indicator 32 for indicating angular positions.

A reference body 34 is arranged coaxially to tip 29 on headstock 26. Reference body 34 comprises several cylindrical discs 35 that differ in diameter, wherein two different reference diameters have been attributed to each measuring range defined by the arrangement of the linear sensors 4a, 4b, 4c, 4d (FIG. 3). By means of reference body 34, it is possible to check the measuring system at the reference diameters and, if necessary, make adjustments. If desired, the reference body 34 may also be activated by the rotary drive 31, whereby measurements may be obtained at different angular positions. For example, when measurements are disturbed by dirt, new clean measuring spots can be set.

The whole arrangement is provided with a covering hood 36 for protection against external influences, such as stray light, dirt, etc., wherein parts or workpieces to be measured are passed in and out through an opening provided with a door 37. Within the covering, it will be convenient to create an over-pressure, for instance by means of a blower, so that the penetration of dirt and dust can be prevented as much as possible.

Figure 5:
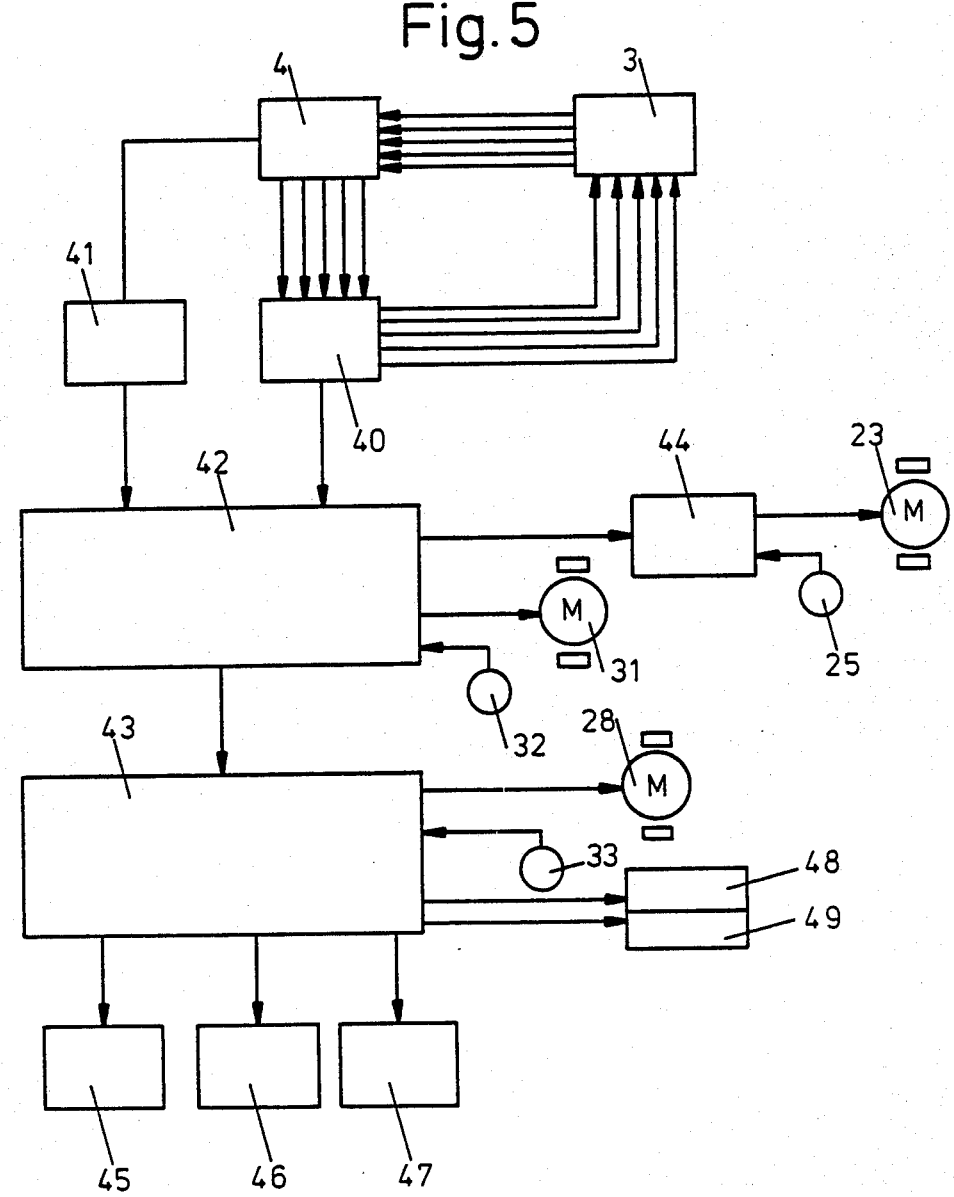
FIG. 5 shows a block diagram of a measuring apparatus in accordance with an illustrative embodiment of the present invention.

FIG. 5 shows a block diagram for the afore-described measuring apparatus. Sensors 4 and the light sources 3 are activated by means of an analog-digital converter 41 and are connected by means of a measuring-range control 40 to an interface computer 42. The computer 42 is also connected to the drive 23 and the distance indicator 25 by way of control device 44. In addition, the computer 42 is connected to the rotational drive 31 and the angle indicator 32. An analysis computer 43 for performing the above-described correlations and calculations is connected to interface computer 42. The computer 43 is provided with an actuating connection for the delivery drive 28 of the tailstock 27 and its angle indicator 33. Furthermore, there are provided on the computer 43, the analysis, indicating and servicing mechanisms 45, 46 and 47.

In order to obtain automatic operation in connection with a processing machine 49 and a loading device 48, the analysis computer 43 is connected with controls of the processing machine 49 and loading device 48.

The measuring apparatus described is primarily intended for the testing and measuring of rotationally symmetrical parts, wherein their diameters, lengths, and contours can be precisely measured. In addition, chamferings, threadings and perforations can be checked. Through the use of the rotary drive, there may also be controlled, measured, and/or tested the roundness and rotational trajectory of a workpiece. It may also be possible to measure or test the longitudinal trajectory of a workpiece or other object. With the measuring method and apparatus of the present invention, it will also be possible to measure the roughness of a surface.

A distance measurement between two edges of a workpiece having different locations along the X-axis can be performed, in accordance with the present invention, without displacing the workpiece or measuring apparatus along the Z-axis (as described in connection with FIGS. 3 and 4). To measure the distance between the two edges at different positions along the Z-axis, a displacement of the workpiece relative to the light source/sensor arrangement along the Z-axis takes place during the measuring process. Thus, a sequence of measurements are made at different axial locations along the workpiece piece to be measured through use of the diffraction patterns formed by illuminating the edges of the workpiece.

The afore-described measuring method, illustrated in FIGS. 1 and 2, can also be used for non-rotationally symmetrical workpieces or other parts, where, in this case, the apparatus described in connection with FIG. 6 must be formed to receive the corresponding parts.

If dirtied parts are to be cleaned before the measuring process, for instance, by immersion in a fluid and/or by the action of a centrifuge, then any remaining residue can be compensated in the measuring process.

By loading stored programs into the interface and/or analysis computers, further parameters can be included to increase measuring precision. Here it will be possible to make the following corrections based on values measured or ascertained:
 temperature workpiece/environment;
 the diffracted image produced by the existing optics vis-a-vis the theoretical image;
 distinctly identifying and/or locating the diffraction maxima and minima allows a conclusion on the type of surface of the parts or objects to be measured, and allows for a determination of the size of the corrections.

Finally, the above described embodiments of the invention are intended to be illustrative only. Numerous, alternative embodiments may be devised by those skilled in the art without departing from the spirit and scope of the following claims.

We claim:

1. An optical electronic method for measuring or testing a workpiece comprising the steps:
 (a) illuminating at least one edge of the workpiece with a coherent monochromatic light source to generate an actual diffraction pattern;
 (b) directly sensing the actual diffraction pattern including a zero order intensity maximum with at least one line of sensors to convert said actual diffraction pattern into electrical signals to produce a first set of data representative of the intensity of light of said actual diffraction pattern as a function of spatial position;
 (c) maintaining a second set of data representative of the intensity of light of a predetermined diffraction pattern as a function of spatial position; and
 (d) correlating said first and second sets of data to compare said actual and said predetermined diffraction patterns.

2. The method of claim 1 wherein said workpiece is rotationally symmetric.

3. A method as claimed in claim 1, wherein said first set of data includes maximum and minimum values of the light intensity of the actual diffraction pattern, and intersection points of the actual diffraction pattern with the average light intensity.

4. A method according to claim 1, wherein through the generation of diffraction images at the upper and the lower edge of said workpiece the measuring distance between the edges is ascertained.

5. A method according to claim 1 in which the workpiece is placed in rotation during or between measurings.

6. An apparatus for optical-electronically measuring or testing an object, said apparatus comprising
 a coherent, monochromatic light source for illuminating at least one edge of the object,
 at least one line of sensors for directly detecting the actual diffraction pattern including a zero order intensity maximum produced as a result of illuminating said edge of said object, and for converting said actual diffraction pattern to electrical signals to produce a first set of data representative of the intensity of light of said actual diffraction pattern as a function of spatial position,
 means for maintaining a second set of data representative of the intensity of light of a predetermined diffraction pattern as a function of spatial position; and
 means for correlating said first and second sets of data to compare said actual and said predetermined diffraction patterns.

7. An apparatus according to claim 6, wherein said apparatus includes several lines of sensors that are arranged in first and second rows in such a way that there is mutual overlapping of the measurement ranges of sensors in said first row and sensors in said second row, each of said sensors in said first and second rows having a coherent monochromatic light source associated therewith.

8. An apparatus according to claim 6, wherein the light source comprises a laser diode and a lens system for the generation of parallel rays.

9. An apparatus according to claim 7, wherein the light sources and the sensors are arranged on a sled displaceable along guide means parallel to the longitudinal axis of the workpiece to be measured so that said workpiece can be measured at various locations along its longitudinal axis.

10. An apparatus according to claim 7, wherein the said apparatus includes a receiving mechanism for said workpiece comprising a tailstock including a delivery drive, and a headstock including a rotary drive, said drives being electronically actuated.

11. An apparatus according to claim 9, wherein a reference body is arranged along the displacement path of the sled.

12. An apparatus according to claim 11, wherein the reference body comprises several cylindrical discs with different diameters.

13. An apparatus according to claim 9, wherein the apparatus is provided with a covering hood for protection against external influences, and wherein within the covering an overpressure is created.

14. An apparatus for measuring a workpiece having a longitudinal axis, comprising:

a source of illumination for providing a beam of coherent, monochromatic light which propagates along a path perpendicular to the longitudinal axis of said workpiece, for illuminating at least one edge of said workpiece, lines of sensor means arranged along said path for directly detecting the actual diffraction pattern including a zero order intensity maximum produced by the diffraction of aid light by said edge, and for converting said actual diffraction pattern into electrical signals to produce a set of data representative of the intensity of light of said actual diffraction pattern as a function of spatial position, means for moving said path and said workpiece longitudinally relative to one another so that an actual diffraction pattern can be detected and a corresponding set of data produced at various longitudinal locations along said workpiece, means for maintaining one or more sets of data representative of the intensity of light as a function of position of one or more predetermined diffraction patterns; and means for correlating each set of data representative of an actual diffraction pattern with a set of data representative of a predetermined diffraction pattern to compare each actual diffraction pattern with a predetermined diffraction pattern.

* * * * *